(12) United States Patent
Allen et al.

(10) Patent No.: US 9,506,604 B2
(45) Date of Patent: Nov. 29, 2016

(54) DEVICE AND METHOD FOR UNFREEZING FROZEN BRAKE LINES OF TRACTOR TRAILERS

(71) Applicants: Robert Allen, Chicago, IL (US); Lorenzo Gibson, Zionsville, IN (US)

(72) Inventors: Robert Allen, Chicago, IL (US); Lorenzo Gibson, Zionsville, IN (US)

(73) Assignee: Robert Allen, Chicago, IL (US)

( * ) Notice: Subject to any disclaimer, the term of this patent is extended or adjusted under 35 U.S.C. 154(b) by 26 days.

(21) Appl. No.: 13/743,475

(22) Filed: Jan. 17, 2013

(65) Prior Publication Data

US 2014/0020776 A1 Jan. 23, 2014

Related U.S. Application Data

(60) Provisional application No. 61/674,021, filed on Jul. 20, 2012.

(51) Int. Cl.
*E03B 7/10* (2006.01)
*F16L 53/00* (2006.01)
*F17D 1/00* (2006.01)

(52) U.S. Cl.
CPC .......... *F17D 1/00* (2013.01); *Y10T 137/87571* (2015.04)

(58) Field of Classification Search
CPC ...... B60T 17/006; F04B 39/068; F17D 1/05; F16L 53/002
USPC ............................... 138/27, 32, 34
See application file for complete search history.

(56) References Cited

U.S. PATENT DOCUMENTS

| | | | |
|---|---|---|---|
| 337,408 A | 3/1886 | Kearns | |
| 1,336,905 A | 4/1920 | Hunzicker | |
| 1,598,888 A * | 9/1926 | Stein | 138/34 |
| 2,147,288 A | 2/1939 | Farmer et al. | |
| 2,201,936 A | 5/1940 | Vorech | |
| 2,330,413 A | 9/1943 | Eaton | |
| 2,670,082 A | 2/1954 | Dunn et al. | |
| 2,670,130 A | 2/1954 | Bloxsom | |
| 2,828,772 A | 4/1958 | Landis | |
| 3,384,123 A | 5/1968 | Saddison | |
| 4,286,613 A * | 9/1981 | Lacoste | 137/62 |
| 4,498,711 A | 2/1985 | Langley et al. | |
| 4,667,781 A | 5/1987 | Lilley et al. | |
| 4,804,013 A | 2/1989 | Wilson | |
| 5,293,904 A | 3/1994 | Wood | |
| 5,488,968 A * | 2/1996 | Price et al. | 137/1 |
| 6,231,313 B1 | 5/2001 | Heitmann et al. | |
| 6,409,289 B2 | 6/2002 | Wagner et al. | |
| 7,089,976 B2 | 8/2006 | Bargy | |
| 2005/0178439 A1* | 8/2005 | Bargy | 137/331 |
| 2009/0095367 A1 | 4/2009 | Socha | |

* cited by examiner

*Primary Examiner* — Paul R Durand
*Assistant Examiner* — Vishal Pancholi
(74) *Attorney, Agent, or Firm* — Polster, Lieder, Woodruff & Lucchesi, LC (57) ABSTRACT

A device is provided to facilitate introduction of a fluid agent (such as a deicing agent) into the air line of a trailer of a tractor trailer. The device comprises a canister defining an upwardly opening chamber, a lid removably securable to the canister to close the chamber, an inlet tube extending from the canister and having a connector at an end of the inlet tube, a valve in said inlet tube; and an outlet tube extending from the canister and having a connector at an end of the inlet tube. The outlet tube is shaped and sized such that the canister chamber can be filled with the liquid agent from the ground and without the need to climb on the chassis of the trailer tractor.

13 Claims, 5 Drawing Sheets

DEVICE AND METHOD FOR UNFREEZING FROZEN BRAKE LINES OF TRACTOR TRAILERS

CROSS-REFERENCE TO RELATED APPLICATIONS

This application claims priority to U.S. App. No. 61/674,021 filed Jul. 20, 2012, which is incorporated herein by reference.

STATEMENT REGARDING FEDERALLY SPONSORED RESEARCH OR DEVELOPMENT

Not Applicable.

BACKGROUND OF THE INVENTION

This application relates to a device and method for unfreezing the brake lines of tractor trailers when they become frozen.

Figure 1:
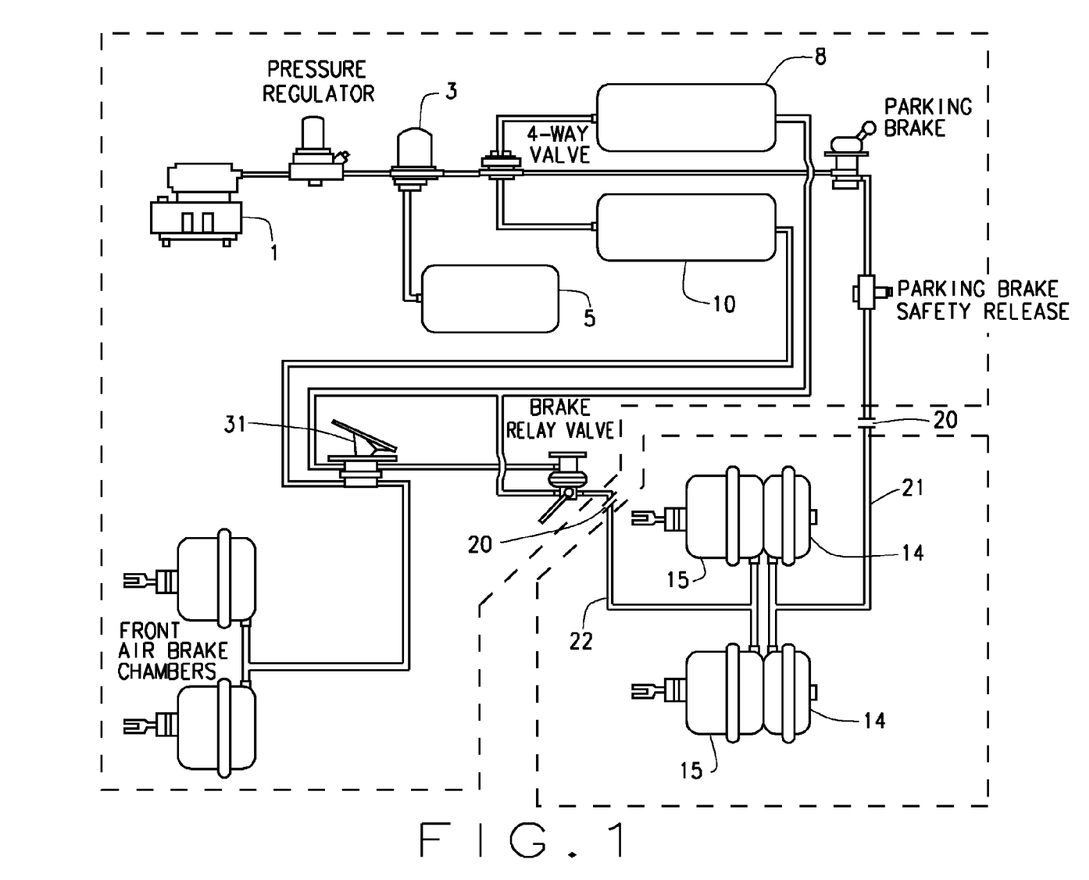
FIG. 1 is a schematic showing the air lines of a pneumatic brake system for a tractor-trailer.

An air brake schematic for a tractor trailer is shown in FIG. 1. A typical air brake system includes an air compressor 1 with a governor which directs compressed air to compressed air reservoir tank 5. The system can include an air drier 3 to remove moisture from the air, and dried compressed air can then be stored in reservoir tanks 8 and 10. At the rear of the trailer, the brake system includes brake valves 14 and 15, which are typically diaphragm valves. Valve 14 is the service brake valve, and valve 15 is a parking brake valve. The valves are connected to slack adjusters (not shown) which are connected to the brakes (i.e., brake linings and drums or rotors). The compressed air reservoirs 5, 8, and 10 are connected to the brake valves 14, 15 by emergency air lines 21 and control air lines 22. The compressed air reservoirs are in the tractor. Thus, the air lines each comprise a first part associated with the tractor and a second part associated with the trailer. These two parts are connected by means of connectors 20, such as glad hand-type connectors. A foot pedal 31 is located in the tractor to be pressed by the operator. Operation of the foot pedal 31 operates valving which releases air from the compressed air tanks, and delivers compressed air to the brake valves 14 and 15 over the control lines 22 to activate the trailer brakes.

Prolonged exposure to cold temperatures can cause moisture in the brake air lines and brake valves to freeze, thus freezing the air lines and brake valves. If brake air lines and valves do freeze, the trailer brakes become inoperable, thus creating potentially serious safety issues. For example, frozen brake air lines and valves can cause a tractor-trailer to jack-knife.

Releasing of the brakes (i.e., unfreezing of the brake lines and valves) requires that the operator exit the tractor, and detach the service hose extending from the tractor from the connector to the air line at the trailer. The connection of the service hose to the trailer air line is often done by means of a glad hand-type connector. A deicing agent, such as an air brake anti-freeze or an air brake evaporating alcohol, is poured into the service hose connector and the service hose is reconnected to the trailer via the mating connectors. The opening in the service hose connector is small, typically about 0.5" (~1.27 cm) in diameter. Hence, it is difficult to pour sufficient amounts of deicing agent into the service hose connector, and the operator will often spill at least some of the deicing agent.

The operator then returns to the tractor, and activates the service valve to apply air pressure to the brake valves at the back of the trailer. This will distribute the alcohol throughout the brake system. Then, the operator needs to go to the rear of the truck, climb under the truck, and, using a torch, heat the brake valves. The operator needs to be careful when heating the valves so as not to melt or otherwise damage the bushings and washers in the valve. Should that occur, the brake valves will need to be replaced, which will increase the operator's downtime and service charges. Once the valves are heated, the operator taps the slack adjusters with a hammer. If a sufficient amount of alcohol was not placed into the air system, the brakes may not release, and the procedure will need to be repeated.

As can be appreciated, this procedure is performed in the cold (i.e., when the temperatures are below freezing). Further, the operator must perform the procedure on the side of the road or highway. This exposes the operator to the hazards of performing procedures on the shoulder of a road or highway. If the operator can successfully release the frozen brakes, the operator can be operating again within a relatively short period of time (30 minutes or so). However, as noted above, the opening to the service line in the connector is small, and it is difficult to pour a sufficient amount of deicing agent into the service hose, at least without spilling the deicing agent. Thus, if the described procedure does not release the brakes, the operator will have to repeat the procedure. If a repeat of the procedure still does not release the brakes, the operator may need to call for repair services. As is known, a service call can dramatically increase the operator's downtime. This will impact the estimated delivery time for the product carried in the trailer. Additionally, service calls are typically expensive.

It would be desirable to provide a device which will more easily and reliably release frozen brake of a tractor trailer.

SUMMARY

Briefly stated, a device for delivering a fluid agent to the brake air lines and brake valves of a tractor trailer comprise a canister comprising a side wall and a bottom defining an upwardly opening chamber having a lid removably securable to the canister to close the chamber; the closure of the chamber being an air tight closure. An inlet tube extends from the canister and has a connector at an end of the inlet tube, the connector being in fluid communication with the chamber. An outlet tube also extends from the canister and has a connector at an end of the inlet tube, the outlet tube connector being in fluid communication with the chamber. The inlet and outlet tube connectors each have an opening and are shaped and configured to be connected to a connector of an air line of a tractor and trailer, respectively. A valve is positioned in either the inlet tube or outlet tube. The valve is selectively movable between a closed position in which the inlet tube connector is not in fluid communication with the chamber and an opened position in which the inlet tube connector is in fluid communication with the chamber.

In accordance with an aspect of the device, the outlet tube is shaped such that an axis of the canister will be substantially vertical when the device is in use and connected to the trailer.

In accordance with an aspect of the device, the outlet tube is rigid.

In accordance with an aspect of the device, the outlet tube is straight.

In accordance with an aspect of the device, the tube defines a bend, such that the end of the outlet tube is elevated relative to the junction of the outlet tube with the canister.

In accordance with an aspect of the device, the inlet tube is rigid.

In accordance with an aspect of the device, the inlet and outlet tubes are shaped and positioned on the device such that the fittings at the end of the inlet and outlet tubes will not interfere with the device sitting flat when the device is set on a surface;

In accordance with an aspect of the device, the inlet and outlet tubes are spaced vertically above the bottom of the canister.

In accordance with an aspect of the device, the opening to the chamber is substantially larger than the opening to the fitting.

In accordance with an aspect of the device, the opening to the chamber is at least 2" in diameter.

In accordance with an aspect of the device, the opening to the chamber has a diameter substantially equal to the diameter of the chamber.

In accordance with a variation of the device, the outlet tube can have a reduced diameter section defining an inner diameter less than an inner diameter of the inlet tube. The reduced diameter section can be preceded by a reduction zone and followed by an expansion zone. The inner diameter of the outlet tube prior to the reduction zone and following the expansion zone can be substantially equal. The inner diameter of the outlet tube prior to the reduction zone can be substantially equal to the inner diameter of the inlet tube.

A method for using the device to release pneumatically controlled brakes of a trailer connected to a tractor when the brakes are frozen comprising the steps of:
a) disconnecting an emergency air line extending from the trailer;
b) connecting the device to a connector of an air line of the trailer;
c) connecting the emergency brake line from the tractor to the inlet tube;
d) pouring a liquid deicing agent into the canister chamber;
e) applying the lid to the canister to close the chamber;
f) activating the emergency air system from the tractor with the with the valve in the closed position,
g) opening the valve to place the chamber in communication with a source of pressurized air and to force the deicing agent into the air lines of the trailer;
h) turning off the emergency air system from the tractor;
i) disconnecting the device from the trailer and the tractor emergency air line; and
j) reconnecting the emergency air line from the tractor to the trailer.

The method can further include a step of confirming that the brakes have been released before turning off the emergency air system.

The step of disconnecting the device comprises:
i1) closing the valve;
i2) shutting of the emergency air supply;
i3) detaching the device outlet from the trailer connector; and
i4) disconnecting the tractor emergency supply hose from the device inlet connector.

In another embodiment, the device consists of a canister comprising a side wall and a bottom defining an upwardly opening chamber; and an outlet tube extending from the canister. A connector at an end of the inlet tube is in fluid communication with the chamber; and has an opening shaped and configured to be connected to a connector of an air line of a trailer. The outlet tube is constructed to enable the canister to be raised above the level of the trailer air line connector when the device is connected to the trailer air line connector.

In one variation of this embodiment, the outlet tube is flexible.

In another variation of this embodiment the outlet tube comprises an inner portion extending generally perpendicularly from the canister, an outer portion generally parallel to the inner portion, and a central portion extending between and joining the inner and outer portions. The central portion defines an angle with the inner and outer portions of greater than 5° and less than 90°. The inner and outer portions are connected to the central portions by joints which enable the inner and outer portions to rotate about their axes relative to the central potion.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what WE presently believe to be the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Figure 2:
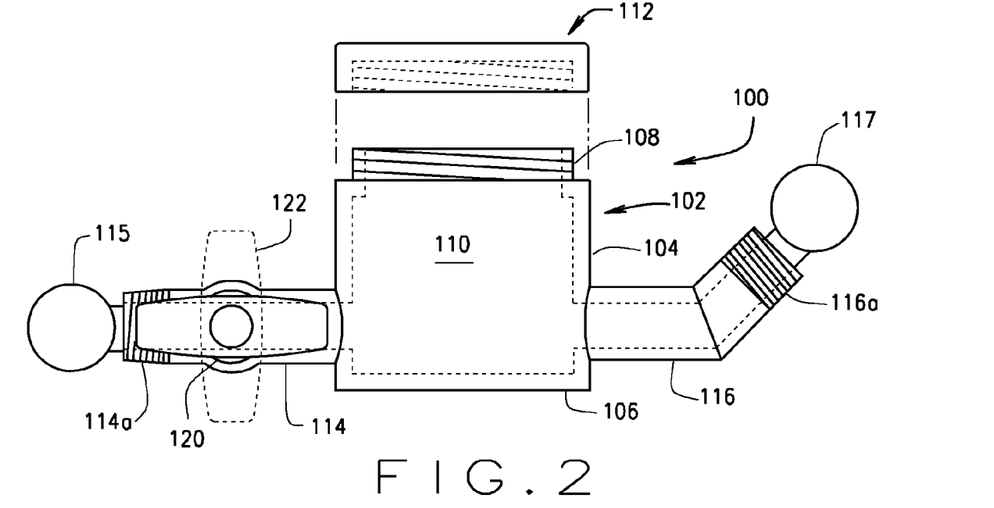
FIG. 2 is a side elevational view of a first illustrative embodiment of a device used for releasing the frozen brakes of a tractor trailer, with internal walls being shown in dotted lines and connectors being shown schematically.
Figure 3:
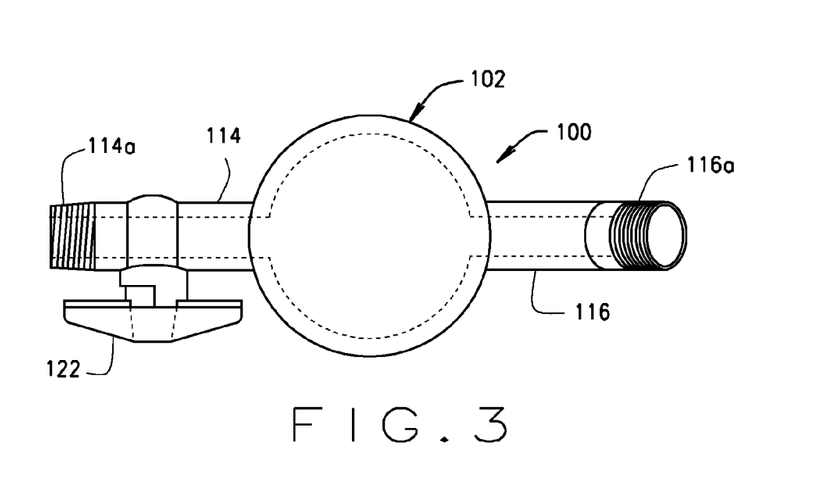
FIG. 3 is a top plan view of the device, again with internal walls being shown in dotted lines.

A device 100 used for releasing frozen brakes is shown generally in FIGS. 2 and 3. The device 100 includes a canister 102 having a side wall 104, a bottom 106, and a threaded lip 108 at the top of the side wall 104. The side wall and bottom define an upwardly opening chamber 110 which can be closed with a lid 112 which can be screwed onto the threaded lip of the canister. The lid 112 can include a rubber gasket seal to provide an air tight closure for the canister chamber 110. The canister is shown with an externally threaded lip. However, the canister could be provided without a lip, but wherein an upper portion of the wall of the chamber is threaded. These internal threads could then mate with an externally threaded rim on the lid. Although the lid 112 is shown to be threaded onto the canister 102, the lid 112 can be connected to the canister in other manners that will allow for an air tight seal between the lid and the canister. For example, a key slot type connection can be used comprising a pin on the lid or the canister, and a bayonet slot on the other of the lid and the canister.

Illustratively, the canister is cylindrical, and the chamber 110 can have a diameter of about 3" (~7.6 cm) and a depth (exclusive of the lip) of about 2" (~5 cm), giving the chamber a volume of about 14 $in^3$ (or about 230 cc or about 8 fluid ounces), exclusive of the volume defined by the lip. As can be appreciated, the opening to the chamber 110 is substantially greater than the opening in the glad hand connector (which is typically about 0.5" in diameter). Preferably, the opening to the chamber is at least 2" in diameter. In the illustrative drawing, the opening to the chamber is substantially the same diameter as the chamber. As will become apparent, the size of the opening facilitates pouring deicing agent into the device.

Figure 9:
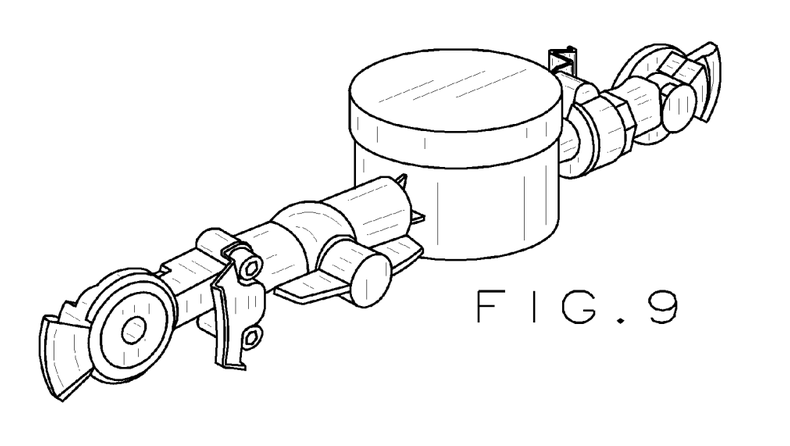
FIGS. 9 and 10 are perspective views of straight and angled devices having glad hand connectors.
Figure 10:
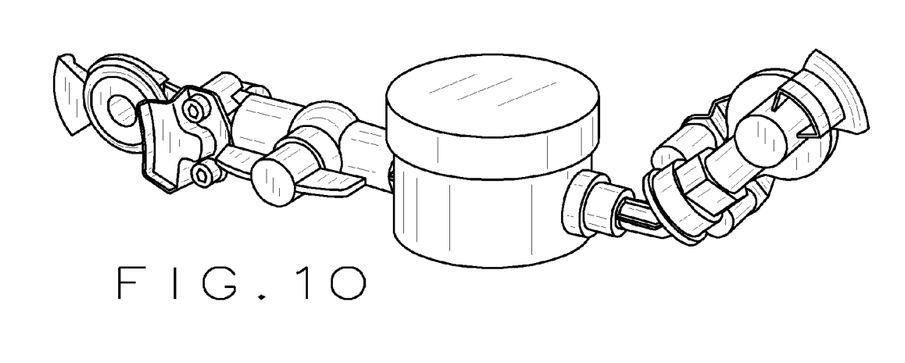

Inlet and outlet tubes 114 and 116 extend from the canister wall, and communicate with the chamber 110. The tubes 114 and 116 are shown to be on opposite sides of the canister, but can be separated by any desired degree. The inlet and outlet tubes, illustratively, can each have an inner diameter of about 0.5" (~1.3 cm). The inlet and outlet tubes 114 and 116 both have threaded ends 114a and 116a, respectively. The threaded end 116a of the outlet tube 116 receives a fitting 117 which can mate with the fitting of the trailer emergency air line. The threaded end 114a of the inlet tube receives a fitting 115 which mates with the fitting at the end of the emergency air line to allow the emergency air line to be connected to the inlet tube 114. These fittings can be any type of fitting that will mate with the existing fitting on the supply hose from the tractor and with the fitting at the trailer. Typically, the tractor and trailer are provided with glad hand type fittings, and thus, the fittings 115 and 117 of the device 100 are preferably also glad hand fittings, as shown in FIGS. 9 and 10 (wherein the fittings are press fit to the inlet and outlet tubes and fixed to the inlet and outlet tubes via fasteners. The fittings 115 and 117 each have openings such that, when the device 100 is connected between the service hose from the tractor and the fitting on the trailer, the device 100 will become incorporated in the brake air system, and the chamber 100 will be in fluid communication with the portion of the air system in the tractor and the portion of the air system in the trailer.

A valve 120 is positioned in the inlet tube 116, and is operated by a valve handle 122. Although shown in the inlet tube, the valve could be positioned in the outlet tube 116. The valve handle and/or the inlet tube can include indicia to indicate the position of the valve (i.e., whether the valve is opened or closed). The valve 120 illustratively is a ball valve, but could be any other type of valve. The valve 120 is moveable between a closed position in which the inlet to the fitting (and hence the portion of the air system in the tractor) is not in fluid communication with the chamber 110 and an open position in which the inlet to the fitting (and hence the portion of the air system in the tractor) is in fluid communication with the chamber 110. Although shown with a valve, the device can be provided without a valve.

Figure 4:
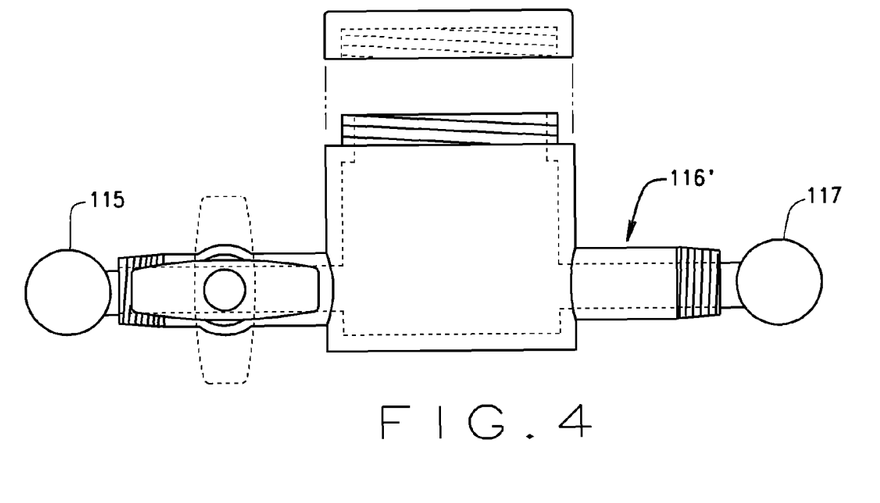
FIG. 4 is a side elevational view of a second illustrative embodiment of the device, with internal walls being shown in dotted lines and connectors being shown schematically.
Figure 5:
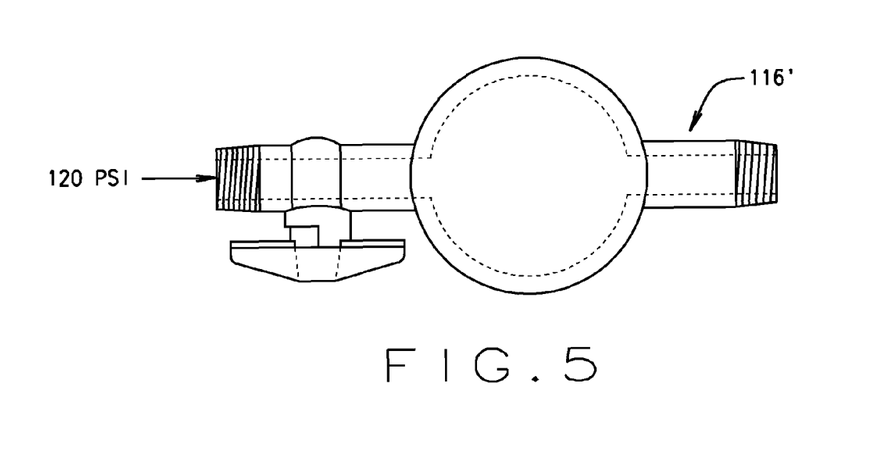
FIG. 5 is a top plan view of the second embodiment of the device, again with internal walls being shown in dotted lines.

The outlet tube 116 is shown to be bent, and can, for example, define an angle of about 45°. In some trailers, the air line extends from the trailer at a 45° angle. Thus, the bend in the outlet line 116 enables the canister 102 to be generally vertical (i.e., the bottom 106 will be generally horizontal when the device is connected to the trailer). In other trailers, the air line extends generally horizontally from the trailer. To enable the canister to be generally upright when connected to such trailers, the outlet tube 116' can be generally straight, as shown in FIGS. 4 and 5. As can be appreciated, the outlet tube is shaped (i.e., bent or angled) such that the canister will be generally upright (i.e., will open upwardly) when the device is in use.

The device 100 is used as follows to release frozen brake lines of a tractor-trailer. Initially, the operator removes the emergency brake line extending from the tractor from the trailer, and attaches the device 100 to the trailer air line fitting via the fitting 117 on the outlet tube 116. The emergency brake line from the tractor is then connected to the inlet tube 114 via the fitting 115 on the inlet tube and the connector on the hose extending from the tractor. The operator then pours evaporating alcohol (or other deicing agent) into the chamber 110 of the canister 102 and closes the canister with the lid 112 to form an air tight closure of the canister. With the device shown, the canister 102 is substantially filled with deicing agent. Hence about 8 oz. of deicing agent is poured into the canister chamber 110. Because of the size of the opening into canister chamber, the alcohol (or other deicing agent) can be poured into the chamber 110 without spilling. Considering that this procedure will be conducted in the temperatures below freezing, the operator can leave his or her gloves on while pouring the deicing agent into the chamber 110 and closing the chamber with the lid 112.

As noted above, the outlet tube 116 is shaped and configured, such that, when the device 100 is connected to the trailer, the canister 102 will be substantially upright. That is, the axis of the canister 102 will be substantially vertical. This facilitates pouring of the deicing agent into the canister chamber 110. Additionally, the outlet tube 116 is preferably rigid (rather than flexible). The rigidity of the tube 116 helps maintain the upright position of the canister and makes it easier for the operator to pour deicing agent into the canister chamber 110 in the cold and to apply the cap 112 to the canister. Further, the outlet tube spaces the canister 102 sufficiently far from the trailer such that the operator can pour the deicing agent into the canister chamber from the side of the trailer, and preferably from the ground. Thus, the operator does not need to climb on the chassis rails of the tractor, which can be icy and slippery. Finally, the rigidity of the outlet tube makes it slightly easier to manipulate the device 100 when connecting the outlet tube to the trailer fitting. Similarly, the inlet tube is preferably rigid as well. This facilitates connection of the supply hose to the inlet tube fitting 115.

Once the canister lid has been applied to the canister, the operator closes the valve 120. The operator then returns to the tractor and activates the emergency air system to provide pressure to the inlet tube 114. The operator then returns to the device 100 and opens the valve 120 using the valve handle 122. When the valve 120 is opened, the pressure from the emergency air line will be applied to the canister 102, and the deicing agent will be forced through the air lines of the trailer and to the trailer brake valves. Obviously, in a device without the valve 120, the deicing agent will be forced through the air lines upon activation of the emergency air system.

If desired, the operator can go to the back of the trailer to ensure that the brakes have been released. The operator can determine if the brakes have been released by checking the position of the slack adjusters. If the slack adjusters have come forward, the brakes will have been released. If the brakes have not released, the operator may need to pour more deicing agent into the air system. To do this, the operator shuts off the flow of compressed air to the trailer by closing the valve 120 on the device 100. The operator can then open the canister, pour in more deicing agent, close the canister, and open the valve 120 to urge this next bolus of deicing agent through the trailer's air system. As can be appreciated, the valve 120 obviates the need for the operator to return to the tractor cab should the pressure to the trailer need to be turned off.

Once the operator has confirmed that the trailer brakes have been released, the operator can detach the device 100 from the trailer. To do this, the operator closes the valve 120, and shuts off the pressure to the tractor's emergency air supply hose from inside the tractor cab. In a valveless version, the operator would simply need to shut off, or deactivate, the emergency air system. The operator then detaches the emergency air hose from the device inlet fitting 115, detaches the device 100 from the trailer fitting, and reattaches the tractor's emergency air hose to the trailer via the respective connectors of the air supply hose and the tractor.

Once the brakes have been released (i.e., deiced), and the device 100 disconnected, the device 100 can be stowed. The device 100 is small enough that it can be stored in a side box on the tractor. Further, as seen in the figures, the inlet and outlet tubes are spaced above the bottom of the canister by a short distance. This allows for the device to sit flat in the tractor's side box with the fittings secured to the inlet and outlet tubes, when the device is not in use.

As can be appreciated, the use of device 100 can be used and operated from the ground, at the side of the tractor-trailer, and thus does not require that the operator climb on the chassis rails between the tractor and trailer, which can be slippery. The device 100 thus makes it easier to release frozen brakes. Additionally, the use of the device 100 substantially reduces the time needed to release frozen brakes of a tractor trailer. This reduces down time and concomitantly, increases in-service time. Further, the use of the device 100 can decrease the need to make expensive service calls related to frozen brake lines.

Figure 6:
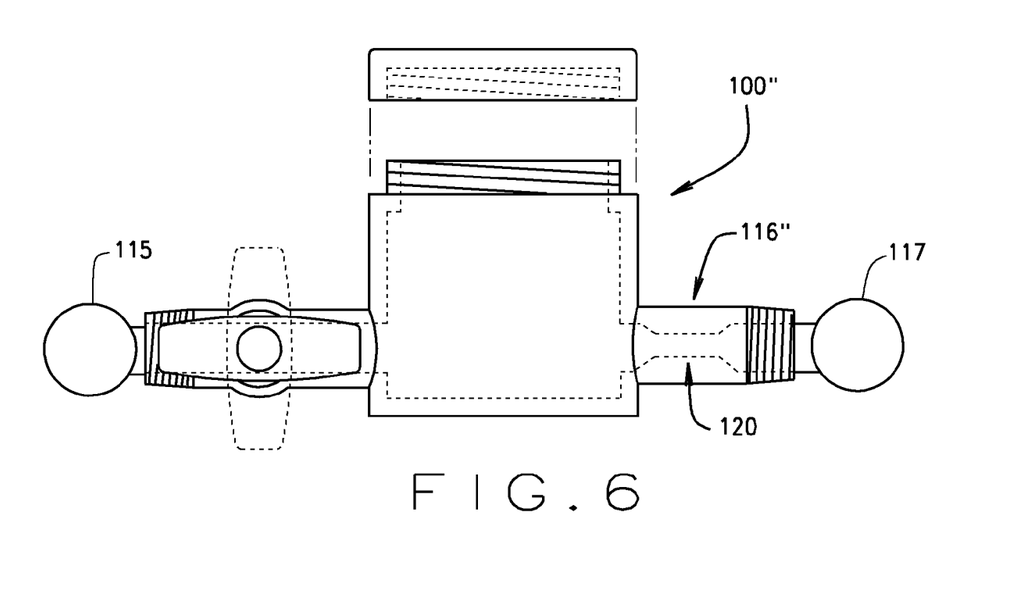
FIGS. 6 and 7 are side elevational and top plan views, respectively, of a third embodiment of the device.
Figure 7:
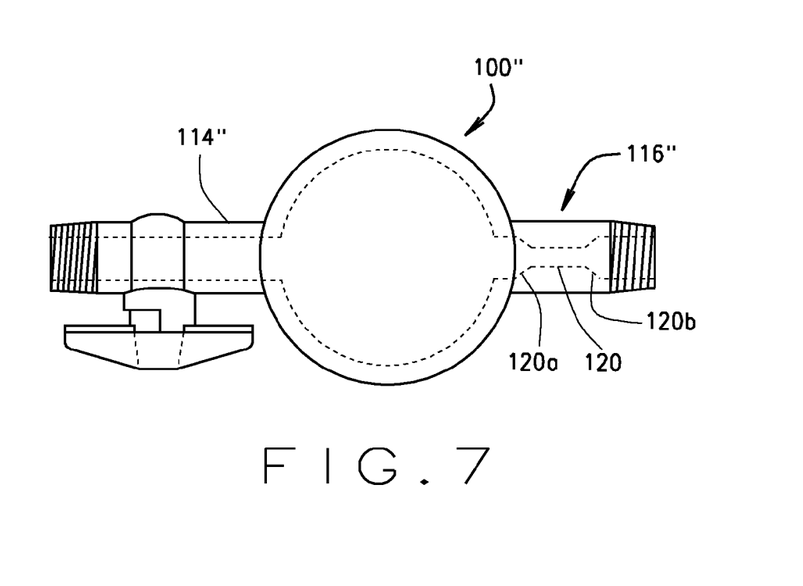

Turning to FIGS. 6 and 7, a third embodiment of the brake release device is shown. The brake release device 100″ is substantially similar to the brake release device 100 of FIGS. 2 and 3. The outlet tubes 116, 116′ of the device 100 (FIGS. 2-5) have an inner diameter that is constant, and that can be substantially equal to the inner diameter of the inlet tube 114. The outlet tube 116″ of the device 100″, on the other hand, has a reduced diameter section 120. This reduced diameter section is preceded by a reduction zone 120a and is followed by an expansion zone 120b. The entrance to the outlet tube 116″ has an inner diameter that is substantially similar to the inner diameter of the inlet tube 114″, and the reduction zone 120a reduces the inner diameter of the outlet tube to a diameter which is less than the inner diameter of the inlet tube 114. For example, the reduced diameter section 120 can have an inner diameter that is about 25% to about 85% of the inner diameter of the entrance to the outlet tube. The expansion zone 120b returns the outlet tube to an inner diameter substantially equal to the inner diameter of the inlet tube 114. Hence, the entrance to, and exit from, the outlet tube 116″ have inner diameters that are substantially the same, and which are substantially equal to the inner diameter of the inlet tube 114″.

Although shown with a straight outlet tube 116″, the outlet tube 116″ could be angled, as with the outlet tube 116 of the device 100 shown in FIGS. 2-3. If the outlet tube 116″ is angled, the outlet tube 116″ may need to be lengthened to accommodate the reduced diameter section, its associated reduction and expansion zones, and the bend in the outlet tube.

The reduced diameter section 120 forms a venturi effect. And thus, the flow rate through the reduced diameter area is increased and the pressure in the reduced diameter area decreased relative to the flow rate and pressure at the entrance to the outlet tube 116″. This reduced diameter section 120 will create a suction which, it is believed, will help entrain the deicing agent into the compressed air which flows into the canister and then passes through the outlet tube 116″ to enter the air line of the trailer. Hence, it is believed that the venturi effect generated by the reduced diameter zone 120 in the outlet tube 116″ will facilitate and enhance delivery of deicing agent to the brake valves, and thus further facilitate releasing of frozen brakes.

Figure 8:
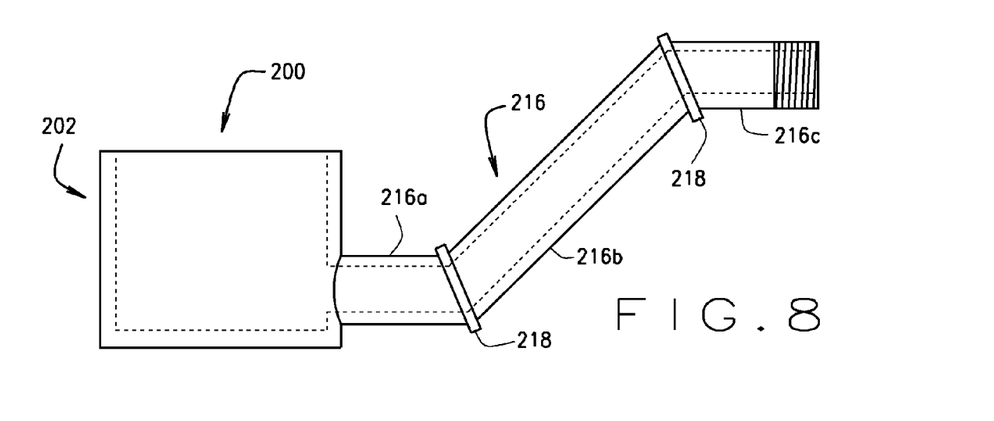
FIG. 8 is a side elevational view of a fourth embodiment of the device, this embodiment being capable of operating at atmospheric pressure.

The device 100, 100″ is pressurized when the valve 120 is opened, and the canister chamber 110 is placed in communication with the tractor air lines. Typically, the compressed air is at a pressure of about 120 psi, and thus the canister will be pressurized to about 120 psi when the valve is opened. The device 100 thus will not operate at atmospheric pressures, and requires the lid 112, or some other means for providing an air-tight closure for the chamber 110. However, in a variant, the device 200 can be operated at atmospheric pressure, and thus does would not need a lid or cover to the chamber 110. In this variant, the outlet tube 216 is shaped and configured such that the canister 202 can be elevated relative to the fitting or connector on the trailer. With the canister elevated, deicing agent can flow under the force of gravity into the trailer air system. Because a gravity operated device does not need the compressed air from the tractor, the gravity operated device does not need an inlet tube. Thus, a gravity operated device 200 would comprise the canister (which defines an upwardly opening chamber) and an outlet tube connected at one end to the chamber and having a fitting at the other to connect the device to the trailer fitting to place the device in fluid communication with the trailer air system. A gravity fed system should be as effective as a pressurized device. However, it may take longer for the deicing agent to reach the brake valves, and it make take more deicing agent to release the brakes. To facilitate the gravity feed of the device, yet allow for easy filling of the container, the device could be designed as shown in FIG. 8. In this figure, the outlet tube 216 includes first and third parallel portions 216a and 216c which are generally perpendicular to the side wall of the canister, and an angled center portion 216b. The three portions 216a-c are joined by pivot joints 218 which allow for the canister to in effect move in an arc, about the end section 216c. This will allow the canister to be filled when at a low position, and when filled, the operator can raise the canister vertically, by moving the canister along the arc. The canister can be raised, for example, by a rod connected to the canister, which would allow for the operator to stay on the ground. Alternatively, the outlet tube could be flexible, and the operator could rely on the flexibility of the tube to elevate the canister sufficiently high to allow the gravity to force the deicing agent into the trailer air lines and to the trailer brake valves. In this embodiment, the height to which the canister can be raised will depend on the length of the outlet tube center section 216b and the angle defined by the center section 216b with the end sections 216a and 216b. In the embodiment wherein the outlet tube is flexible, the height to which the canister can be raised will be limited by the length of the outlet tube.

As various changes could be made in the above constructions without departing from the scope of the invention, it is intended that all matter contained in the above description or shown in the accompanying drawings shall be interpreted as illustrative and not in a limiting sense. Although the device 100 is described for use in releasing frozen brakes, it will be apparent that the device 100 could also be used to pass conditioners (such as valve seal conditioners) through the air system of the trailer. The device 100 is preferably made from a PVC or metal, but can be made from any material which will withstand the environment and pressures to which the device will be subjected. Although rigid inlet and outlet tubes are preferred, either or both of the tubes 114 and 116 could be flexible. The inlet and outlet tubes could be positioned such that the bottom of the inner surface of the tubes is level with the bottom of the chamber 110. This would reduce potential dead space in the chamber and better ensure that all the deicing agent is forced into the trailer air supply system. In this case, the inlet and outlet tubes could be configured to enable the device to sit flat when the fittings are mounted to the ends of the tubes. The inlet tube could thus be provided with a bend, and the outlet tube could be provided with a double bend (to appear, for example, as  ). Alternatively, if the inlet and outlet tubes are even with the bottom of the chamber 110, the canister can be provided with a feet or a bottom rim which raises the tubes sufficiently high such that fittings will not interfere with the device sitting flat. These examples are merely illustrative.

The invention claimed is:

1. A portable device for delivering a fluid agent to the brake air lines and brake valves of a tractor trailer; the device being removably insertable in the air line of the tractor trailer and comprising:
    a canister comprising a side wall and a bottom defining an upwardly opening chamber, wherein said bottom is flat such that said canister is self-supporting when placed on a level surface;
    a lid removably securable to the canister to close the chamber; the closure of the chamber being an air tight closure;
    a rigid inlet tube extending from the canister side wall and having an inlet connector at an end of the rigid inlet tube, the rigid inlet tube placing the inlet connector in fluid communication with the chamber via an opening in the side wall of the canister and distinct from the opening to the chamber; the inlet connector having an opening and being shaped and configured to be removably connected to a connector of an air supply hose of a trailer tractor;
    a valve positioned in the rigid inlet tube, the valve being selectively movable between a closed position in which said inlet tube connector is not in fluid communication with said chamber and an opened position in which said inlet tube connector is in fluid communication with said chamber;
    a rigid outlet tube extending from the canister side wall and having an outlet connector at an end of the rigid outlet tube, the rigid outlet tube placing the outlet connector in fluid communication with the chamber via an opening in the side wall and distinct from the opening to the chamber; the outlet connector having an opening and being shaped and configured to be removably connected to a connector of an air line of a trailer;
    wherein the opening to the chamber is substantially larger than the openings in the side wall and the connectors at the end of the inlet and outlet tubes; and
    the outlet tube being shaped such that an axis of the canister will be substantially vertical when the device is in use and connected to the trailer.

2. The device of claim 1 wherein said outlet tube is straight.

3. The device of claim 1 wherein said outlet tube defines a bend, such that the end of said outlet tube is elevated relative to the junction of the outlet tube with the canister.

4. The device of claim 1 wherein the inlet and outlet tubes are shaped and positioned on the device such that the connectors at the end of the inlet and outlet tubes will not interfere with the device sitting flat when the device is set on a surface.

5. The device of claim 4 wherein the inlet and outlet tubes are spaced vertically above the bottom of the canister.

6. The device of claim 1 wherein the opening to the chamber is at least 2" in diameter.

7. The device of claim 1 wherein the opening to the chamber has a diameter substantially equal to the diameter of the chamber.

8. The device of claim 1, wherein the outlet tube has a section of reduced inner diameter which is preceded by a reduction zone and followed by an expansion zone.

9. The device of claim 8, wherein the reduced diameter section has an inner diameter less than an inner diameter of the inlet tube.

10. The device of claim 9 wherein the inner diameter of the outlet tube prior to the reduction zone and following the expansion zone are substantially equal.

11. The device of claim 10 wherein the inner diameter of the outlet tube prior to the reduction zone is substantially equal to the inner diameter of the inlet tube.

12. The device of claim 1 wherein the outlet tube comprises a rigid inner portion extending generally perpendicularly from the canister side wall, a rigid outer portion generally spaced vertically from the inner portion and parallel to the inner portion, and a rigid central portion extending between and joining the inner and outer portions; the central portion defining an angle with the inner and outer portions of greater than 5° and less than 90°; the inner and outer portions being connected to the central portions by joints which enable the outer portion to rotate about an axis defined by the inner portion of the outlet tube or to enable the canister to rotate in an arc about an axis defined by the outer portion of the outlet tube.

13. A device for delivering a fluid agent to the brake air lines and brake valves of a tractor trailer; the device comprising:
    a canister comprising a side wall and a bottom defining an upwardly opening chamber, wherein said bottom is flat such that said canister is self-supporting when placed on a level surface;
    a lid removably securable to the canister to close the chamber; the closure of the chamber being an air tight closure;
    a rigid inlet tube extending from the canister and having a connector at an end of the inlet tube, the inlet tube placing the connector in fluid communication with the chamber via an opening in the side wall and distinct from the opening to the chamber; the connector having an opening and being shaped and configured to be connected to a connector of an air supply hose of a trailer tractor;

a valve positioned in the rigid inlet tube, the valve being selectively movable between a closed position in which said inlet tube connector is not in fluid communication with said chamber and an opened position in which said inlet tube connector is in fluid communication with said chamber;

a rigid outlet tube extending from the canister and having a connector at an end of the outlet tube, the outlet tube placing the connector in fluid communication with the chamber via an opening in the side wall and distinct from the opening to the chamber; the connector having an opening and being shaped and configured to be connected to a connector of an air line of a trailer;

wherein the outlet tube has at least a reduced diameter section having defining an inner diameter less than an inner diameter of the inlet tube; the reduced diameter section is preceded by a reduction zone and followed by an expansion zone; the inner diameter of the outlet tube prior to the reduction zone and following the expansion zone are substantially equal; and the inner diameter of the outlet tube prior to the reduction zone is substantially equal to the inner diameter of the inlet tube;

wherein the opening to the chamber is substantially larger than the openings in the side wall and the connectors at the end of the inlet and outlet tubes; and the outlet tube being shaped such that an axis of the canister will be substantially vertical when the device is in use and connected to the trailer.

* * * * *